US012697886B2

(12) United States Patent
Luo et al.

(10) Patent No.: US 12,697,886 B2
(45) Date of Patent: Aug. 4, 2026

(54) POWER MODULE AND INVERTER MODULE DESIGN TO MINIMIZE PARASITIC INDUCTANCE AND OPTIMIZE THERMAL PERFORMANCE

(71) Applicant: GM GLOBAL TECHNOLOGY OPERATIONS LLC, Detroit, MI (US)

(72) Inventors: Yilun Luo, Ann Arbor, MI (US); Muhammad Hussain Alvi, Troy, MI (US); Junghoon Kim, Ann Abor, MI (US); Khorshed Mohammed Alam, Canton, MI (US); Ming Liu, Shanghai (CN); Sanjeev M. Naik, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 631 days.

(21) Appl. No.: 18/133,351

(22) Filed: Apr. 11, 2023

(65) Prior Publication Data

US 2024/0190266 A1      Jun. 13, 2024

(30) Foreign Application Priority Data

Dec. 9, 2022    (CN) .......................... 202211577341.6

(51) Int. Cl.
H02M 7/00        (2006.01)
B60L 50/13        (2019.01)
(Continued)

(52) U.S. Cl.
CPC ........... B60L 50/13 (2019.02); H02M 1/0019 (2021.05); H02M 7/003 (2013.01); H02M 7/493 (2013.01); B60L 2210/44 (2013.01)

(58) Field of Classification Search
CPC .. B60L 50/13; B60L 2210/44; H02M 1/0019; H02M 7/003; H02M 7/493; H02M 7/5387; H05K 7/2089–20909
See application file for complete search history.

(56) References Cited

U.S. PATENT DOCUMENTS

2005/0054147 A1* 3/2005 Gustmann ............... H01L 24/49
                                                                  257/E25.016
2019/0320549 A1* 10/2019 Song .................... H05K 5/0026
(Continued)

FOREIGN PATENT DOCUMENTS

JP      2004 364 427  A      12/2004
JP      2007 215 396  A      8/2007

OTHER PUBLICATIONS

Yasuhiko JP2004364427A translation (Year: 2004).*
Office Action issued Jul. 9, 2024 in German Application No. 10 2023 104 213.0; 8pgs.

*Primary Examiner* — Jacob R Crum

(57) ABSTRACT
A leg of a power converter includes: a first one of (a) a first power module and (b) a first die, the first one including a high side switch having a first terminal configured to be connected to a first direct current (DC) busbar having a first potential; and a second one of (a) a second power module and (b) a second die, the second one including a low side switch having a first terminal configured to be connected to a second DC busbar having a second potential that is different than the first potential; and an alternating current (AC) busbar disposed vertically (a) between the first one and the second one and (b) between the first DC busbar and the second DC busbar.

20 Claims, 17 Drawing Sheets

(51) Int. Cl.
    *H02M 1/00*        (2006.01)
    *H02M 7/493*     (2007.01)

(56)             References Cited

U.S. PATENT DOCUMENTS

2021/0176901 A1\*   6/2021   Hampo ................... H05K 7/209
2021/0400815 A1\*   12/2021   Salvatore ............... H05K 7/209
2024/0030100 A1\*   1/2024   Ruppert ............. H01L 21/4871

\* cited by examiner

504

508

508

504

POWER MODULE AND INVERTER MODULE DESIGN TO MINIMIZE PARASITIC INDUCTANCE AND OPTIMIZE THERMAL PERFORMANCE

CROSS-REFERENCE TO RELATED APPLICATIONS

This application claims the benefit of Chinese Patent Application No. 20221157341.6, filed on Dec. 9, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to inverters for motors of vehicles and more particularly to systems and methods for controlling switching of inverters.

Some types of vehicles include only an internal combustion engine that generates propulsion torque. Electric vehicles may not include an internal combustion engine and may rely on one or more electric motors for propulsion.

Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a leg of a power converter includes: a first one of (a) a first power module and (b) a first die, the first one including a high side switch having a first terminal configured to be connected to a first direct current (DC) busbar having a first potential; and a second one of (a) a second power module and (b) a second die, the second one including a low side switch having a first terminal configured to be connected to a second DC busbar having a second potential that is different than the first potential; and an alternating current (AC) busbar disposed vertically (a) between the first one and the second one and (b) between the first DC busbar and the second DC busbar.

In further features, the AC busbar is: disposed between a first vertically lower surface of the first one and a second vertically upper side of the second one; and electrically connected to second terminals of the high side and low side switches.

In further features, the AC busbar is configured to be electrically connected to a phase of an electric motor.

In further features, electrically insulative material is disposed between: the first vertically lower surface of the first one and the AC busbar; and the second vertically upper surface of the second one and the AC busbar.

In further features: a first heat sink is configured to draw heat away from the first one; and a second heat sink is configured to draw heat away from the second one.

In further features: the first heat sink is disposed on a first vertically upper surface of the first one; and the second heat sink is disposed on a second vertically lower surface of the second one.

In further features: the first heat sink is disposed on a first vertically lower surface of the first one; and the second heat sink is disposed on a second vertically upper surface of the second one.

In further features: a first heat sink is disposed on a first vertically upper surface of the first one; a second heat sink is disposed on a first vertically lower surface of the first one; a third heat sink is disposed on a second vertically upper surface of the second one; and a fourth heat sink is disposed on a second vertically lower surface of the second one.

In further features, the AC busbar includes: a first electrically conductive portion that is disposed vertically above a first vertically upper surface of the first one; a second electrically conductive portion that is disposed vertically below a second vertically lower surface of the second one; and a third electrically conductive portion that is electrically connected to the first and second electrically conductive portions.

In further features, the AC busbar is configured to be electrically connected to a phase of an electric motor.

In further features, electrically insulative material is disposed between: the first vertically upper surface of the first one and the first electrically conductive portion; and the second vertically lower surface of the second one and the second electrically conductive portion.

In further features, a capacitor is disposed vertically between the first and second DC busbars.

In further features, the capacitor is disposed horizontally beside the first and second ones.

In further features, the capacitor is disposed one of: vertically above the first one; and vertically below the second one.

In further features, the AC busbar extends horizontally through an aperture through the capacitor.

In further features, a system includes: a housing; the leg, where the leg is disposed within the housing; and coolant within the housing.

In further features, the first and second DC busbars each include first and second copper layers directly bonded to a ceramic layer.

In further features: a first metal layer is configured to electrically connect the first terminal of the high side switch to the first DC busbar; a second metal layer is configured to electrically connect a second terminal of the high side switch to an output busbar; a third metal layer is configured to electrically connect the first terminal of the low side switch to the second DC busbar; and a fourth metal layer is configured to electrically connect a second terminal of the low side switch to the AC busbar.

In further features, a spacer is disposed vertically one of: between the first DC busbar and the AC busbar; and between the second DC busbar and the AC busbar.

In further features, the spacer includes an internal coolant channel configured to receive a coolant.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An inverter module of a vehicle includes legs of switches that regulate current flow (a) from a battery to an electric motor and (b) from the electric motor to the battery. A direct current (DC) bus capacitor may be connected between the inverter module and the battery. Pulse width modulated (PWM) signals are used to control switching of the legs. Each leg includes a high side switch implemented in a high side module and a low side switch implemented in a separate low side module. The low and high side modules include dies and could be disposed on the same horizontal plane (e.g., see FIG. 5).

According to the present application, the low and high side modules are disposed on the same vertical plane (e.g., see FIG. 6) and separated vertically. In other words, the high side module is disposed vertically above or below the low side module. The magnetic fields of the low and high side modules overlap to a greater extent and therefore cancel to a greater extent than if the low and high side modules are disposed on the same horizontal plane. This minimizes parasitic inductance and improves thermal performance of the inverter module. In various implementations, an output alternating current (AC) busbar may be disposed between the low and high side modules to increase magnetic field cancellation.

Figure 1:
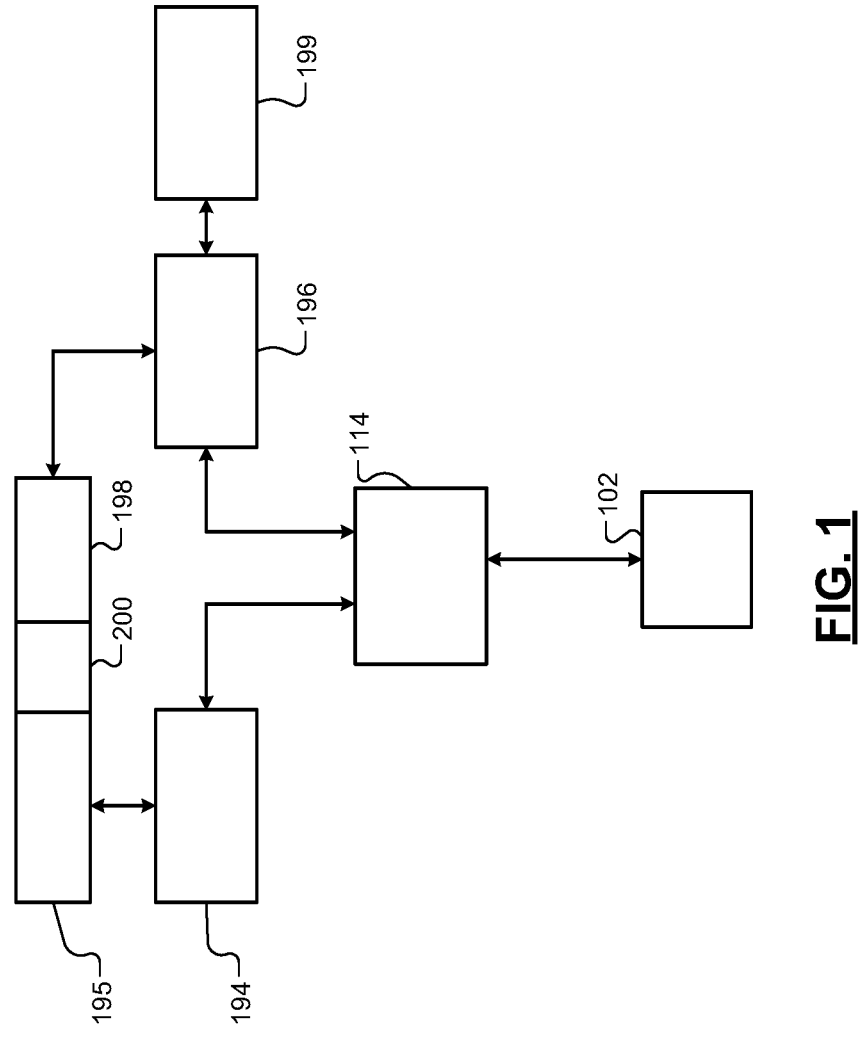
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, semi-autonomous vehicles, non-autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198.

Figure 2:
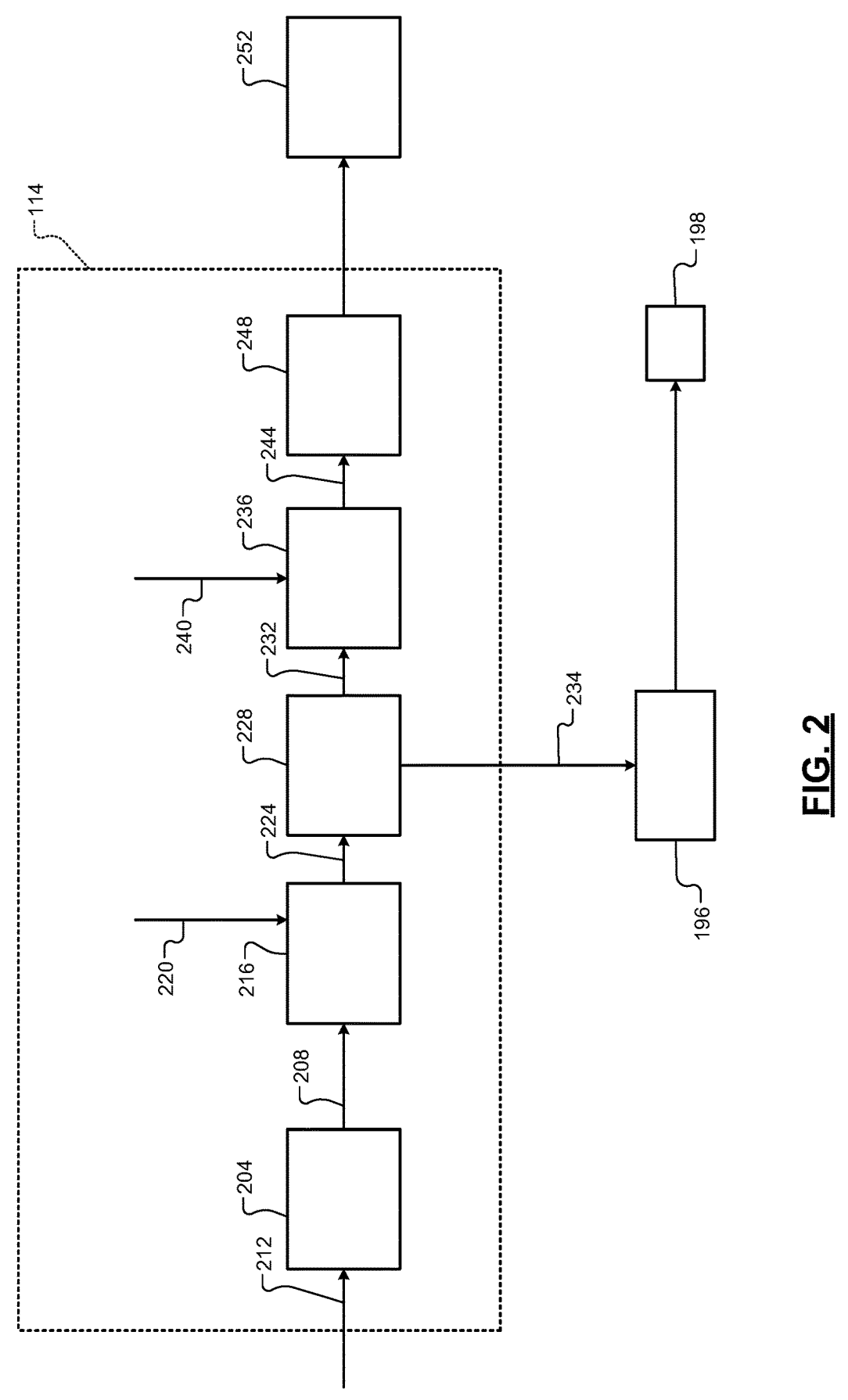
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 may determine the driver torque request 208 using one or more lookup tables or equations that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of an electric vehicle, the ECM 114 may be omitted, and the driver torque module 204 and the axle torque arbitration module 216 may be implemented within the motor control module 196. In electric vehicles, the driver torque module 204 may input the driver torque request 208 to the motor control module 196, and the components related to controlling engine actuators may be omitted.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module based on the motor torque request 234, as discussed further below. The inverter module converts direct current (DC) power into alternating current (AC) power. The inverter module applies AC power to motor 198. Switching of the inverter module controls torque of the electric motor 198. The inverter module also converts power generated by the electric motor 198 into DC power and outputs DC power for the battery 199, for example, to charge the battery 199.

The inverter module includes a plurality of switches, such as n legs of switches where n is an integer greater than or equal to 1 (e.g., 2, 3, etc.). The motor control module switches the switches to apply alternating current (AC) power to the electric motor 198 to drive the electric motor 198. For example, the inverter module may generate n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198. The output shaft of the electric motor 198 is connected to one or more wheels of the vehicle.

In various implementations, one or more filters (e.g. capacitors) may be electrically connected between the inverter module and the battery 199. The one or more filters may be implemented, for example, to filter power flow to and from the battery 199. As an example, a filter including one or more capacitors and resistors may be electrically connected in parallel with the battery 199 and the inverter module.

Figure 3:
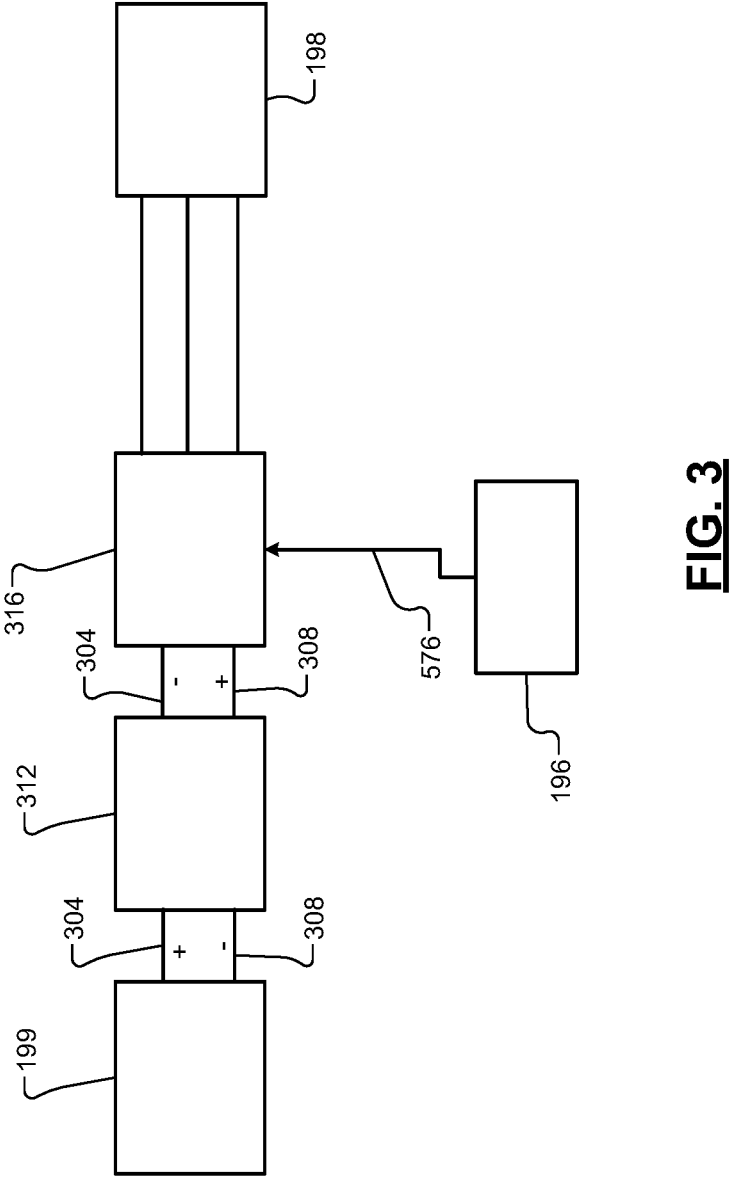
FIG. 3 includes a schematic including an example implementation of a power control system.

FIG. 3 includes a schematic including an example implementation of a power control system. The battery 199 may also be referred to or include a battery pack, as discussed above.

High (positive, DC+) and low (negative, DC−) sides 304 and 308 (bus bars) are connected to positive and negative terminals, respectively, of the battery 199. One or more capacitors, such as capacitor 312, is/are connected in parallel with the battery 199 between the high and low sides 304 and 308. The capacitor(s) stabilize the DC bus and provide a low impedance voltage source to the inverter module since the battery 199 may have a higher impedance.

An inverter module 316 includes three legs, one leg connected to each phase of the electric motor 198. The inverter module 316 controls current flow to the legs/phases of the electric motor 198. The inverter module 316 converts DC power from the high and low sides 304 and 308 into 3-phase AC power and outputs the AC power to the electric motor 198.

Figure 4:
FIG. 4 includes a schematic of an example implementation of an inverter module.

FIG. 4 includes a schematic of an example implementation of the inverter module 316. As stated above, the inverter module 316 includes three legs. One leg is connected to each phase of the electric motor 198.

A first leg 512 includes first and second switches 516 and 520. The switches 516 and 520 each include a first terminal, a second terminal, and a control terminal. Each of the switches 516 and 520 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 516 is connected to the high side 304. The second terminal of the first switch 516 is connected to a node 504. The second terminal of the second switch 520 may be connected to the low side 308. The node 504 is connected to the second terminal of the first switch 516, the first terminal of the second switch 520, and a first phase (e.g., a) of the electric motor 198.

The first leg 512 may include first and second diodes 524 and 528 connected anti-parallel to the switches 516 and 520, respectively. In other words, an anode of the first diode 524 may be connected to the second terminal of the first switch 516, and a cathode of the first diode 524 may be connected to the first terminal of the first switch 516. An anode of the second diode 528 may be connected to the second terminal of the second switch 520, and a cathode of the second diode 528 may be connected to the first terminal of the second switch 520. The diodes 524 and 528 form one phase of a three-phase rectifier for converting power from the electric motor 198 into power for the battery 199. However, the diodes 524 and 528 may be omitted, such as if switches 516, 540, 556, 520, 544, and 560 are MOSFETS (with a built in diode). The diodes 524 and 528 may be with the first and second switches 516 and 520 in respective dies of power modules, as discussed further below.

The inverter module 316 also includes second and third legs 532 and 536. The second and third legs 532 and 536 may be (circuitry wise) similar or identical to the first leg 512. In other words, the second and third legs 532 and 536 may each include respective switches and diodes like the switches 516 and 520 and the diodes 524 and 528, connected in the same manner as the first leg 512. For example, the second leg 532 includes switches 540 and 544 and anti-parallel diodes 548 and 552. A node 542 is connected to the first terminal of the switch 544, and a second stator winding (e.g., b) of the electric motor 198. The third leg 536 includes switches 556 and 560, and anti-parallel diodes 564 and 568. A node 570 is connected to the first terminal of the switch 560 and a third stator winding (e.g., c) of the electric motor 198. Like the diodes 524 and 528, the diodes 548, 552, 564, and 568 may be omitted.

Control terminals of the switches of the inverter module 316 are connected to switch signals 576 from the motor control module 196. The motor control module 196 generates the switch signals 576 such that the high side switch of a leg is on while the low side switch of that leg is off and vice versa. The motor control module 196 generates the switch signals 576 using pulse width modulation (PWM) control.

The control signals of the gates of the low side switches 520, 544, and 560 may be inverted such that the control signals applied to the low side switches 520, 544, and 560 are opposite in polarity to the control signals applied to the gates of the high side switches 516, 540, and 556.

Figure 6:
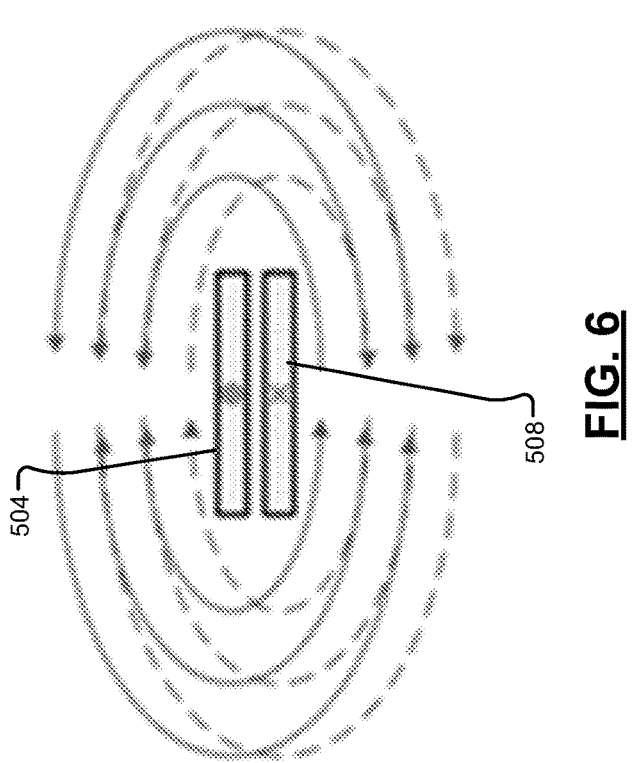
FIG. 6 is a perspective view illustrating electrical conductors arranged on the different horizontal planes and vertically separated.
Figure 5:
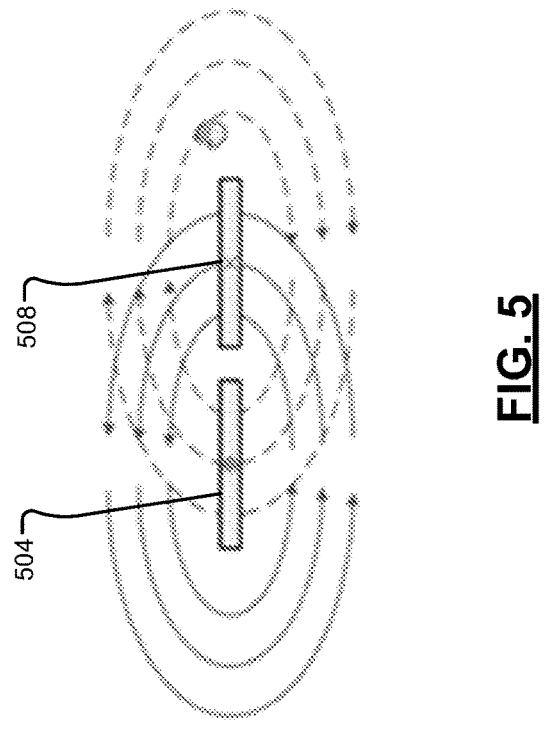
FIG. 5 is a perspective view illustrating electrical conductors arranged on the same horizontal plane.

FIGS. 5 and 6 include example side (horizontal) perspective views of arrangements of first and second electrical conductors (e.g., bus bars, power modules, etc.) 504 and 508. As illustrated in FIG. 5, the first and second conductors 504 and 508 could be arranged on the same horizontal plane. According to the present application, however, as illustrated in FIG. 6, the first and second conductors 504 and 508 are disposed on different vertical planes. More specifically, the first conductor 504 is disposed vertically above the second conductor 504.

The first and second conductors 504 and 508 generate magnetic flux when current flows through the first and second first and second conductors 504 and 508, respectively. FIG. 5 illustrates example magnetic flux lines if the first and second conductors 504 and 508 are disposed on the same horizontal plane. As illustrated by FIG. 6, the magnetic flux produced by the first and second conductors 504 and 508 overlaps to a greater extent and therefore cancels more when the first conductor 504 is disposed vertically above the second conductor 508. The present application minimizes parasitic inductance and optimizes switching and thermal performance of the inverter module 316.

A first power module 604 includes the first switch 516. The first power module 604 does not include the second switch 520. The first module 604 may also include the antiparallel diode 524. A second power module 608 includes the second switch 520. the second power module 608 does not include the first switch 516. The second power module 608 may also include the antiparallel diode 528. While the switches of the first leg 512 will be described, the switches of the other legs may similarly be implemented and arranged in power modules. Also, while the example of an inverter module is provided, the present application is also applicable to power modules of other types of power converters including half bridges of switches, such as boost converters, buck converters, boost/buck converters, and other types of voltage converters. While the example of the first and second power modules is described, the present application is also applicable to the high and low side switches 516 and 520 and first and second dies including the first and second switches 516 and 520.

The first and second power modules 604 and 608 are disposed on different vertical planes. More specifically, the first power module 604 is disposed vertically above the second power module 608. Edges of the first power module 604 may be disposed vertically above associated edges, respectively, of the second power module 608.

The first and second power modules 604 and 608 generate magnetic flux when current flows through the first and second power modules 604 and 608, respectively. The magnetic flux produced by the first and second power modules 604 overlaps to a greater extent and therefore cancels more when the first power module 604 is disposed vertically above (and parallel to) the second power module 608. The bus bars being parallel to each other also cancels magnetic flux to a greater extent. While the example of the first power module 604 being disposed vertically above the second power module 608 is shown, the present application is also applicable to the second power module 608 being disposed vertically above the first power module 604. The present application minimizes parasitic inductance and optimizes switching and thermal performance of the inverter module 316.

Figure 7:
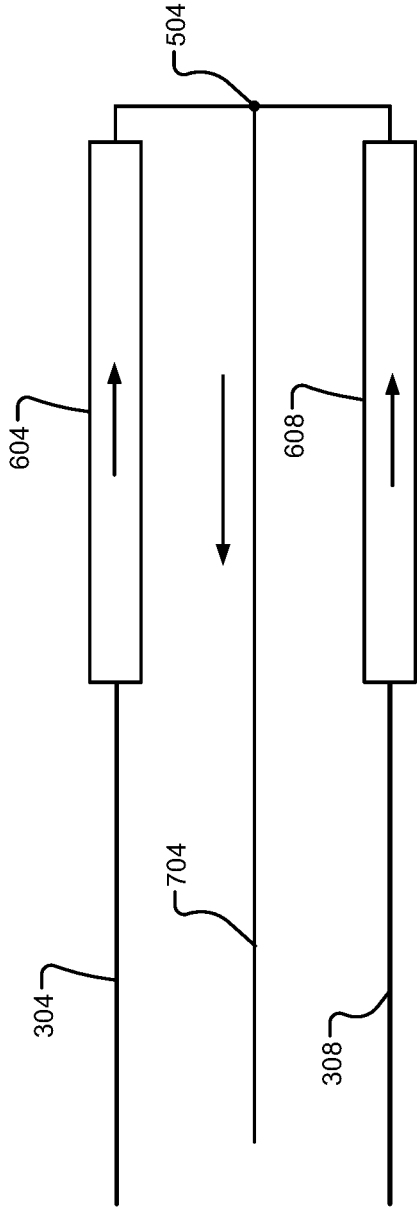
FIGS. 7-17 are cross-sectional view of examples of the first leg of the inverter module.
Figure 7:

FIG. 7 is a cross-sectional view of an example implementation of the first leg 512 of the inverter module. As illustrated, the high side (busbar) 304 (+DC) is connected to the first power module 604, and the low side (busbar) 308 is connected to the second power module 608. Arrows in FIG. 7 illustrate example directions of current flow. While only one leg is shown, each of the legs may be identical.

AC phase conductor 704 that is electrically connected between the node 504 (between the first and second switches 516 and 520) and a winding of the motor 198 is extends vertically between the first power module 604 and the second power module 608. Current flow through the conductor 704 is the opposite as current flow through the power modules 604 and 608, thereby minimizing magnetic flux and increasing magnetic flux cancellation. The AC conductor 704 cancels with magnetic flux of the power modules 604 and 608 and also cancels with magnetic flux with the high and low side bus bars 304 and 308. Electrically insulative material may be disposed between first power module 604 and the conductor 704 and between the second power module 608 and the conductor 704.

While FIG. 7 illustrates the 304 and 308 extending in only one direction (left), 304 and 308 may extend in both directions (left and right), such as illustrated in FIG. 4.

Figure 8:
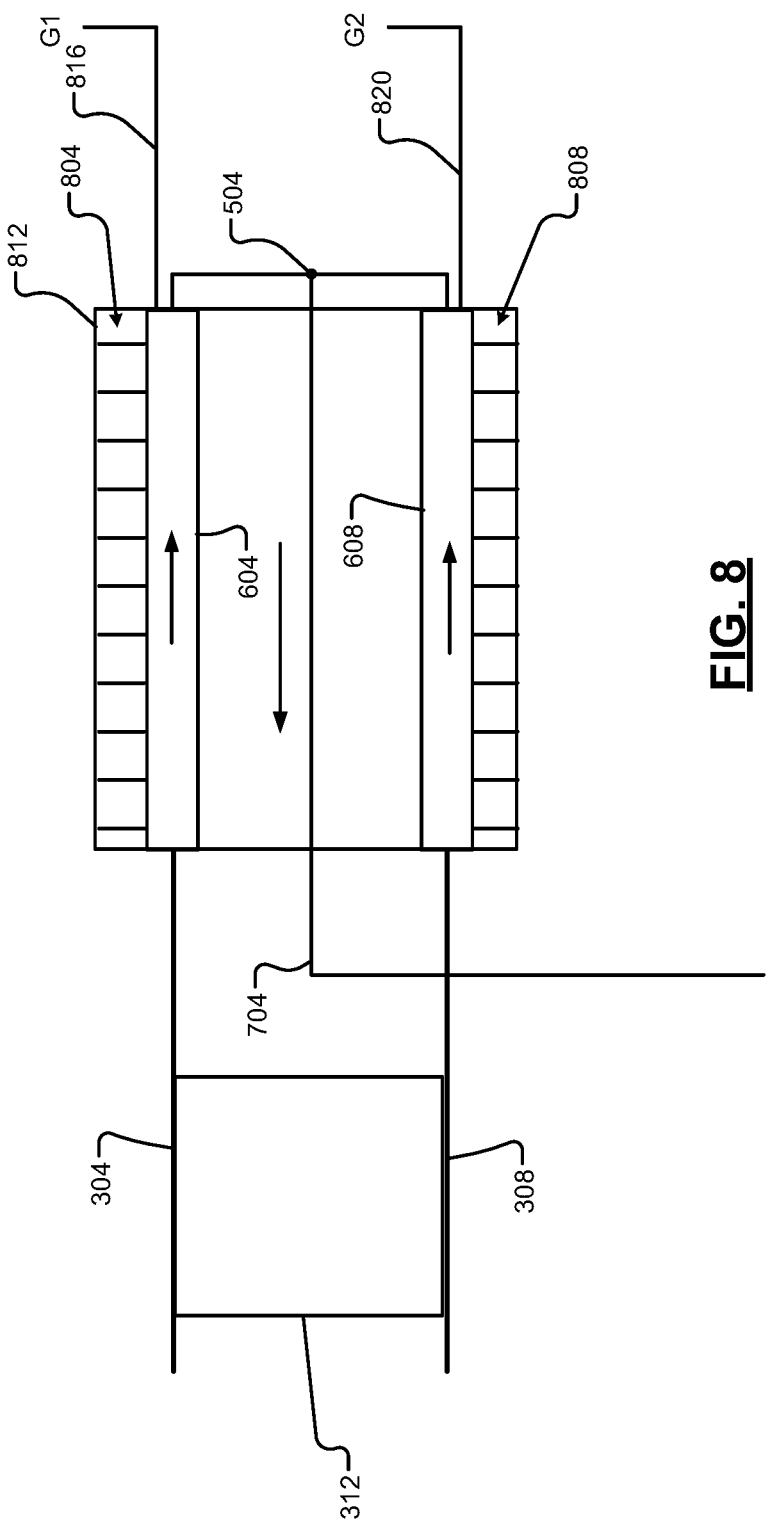

FIG. 8 is a cross-sectional view of an example implementation of the first leg 512 of the inverter module. As Illustrated in FIG. 8, the capacitor(s) 312 may be disposed vertically between the high and low sides 304 and 308. The capacitor(s) 312 may be disposed horizontally away from the first and second power modules 604.

In various implementations, heat sinks may be provided on one or both of the first and second power modules 604 and 608. In the example of FIG. 8, a first heat sink 804 is disposed on a vertically upper side of the first power module 604, and a second heat sink 808 is disposed on a vertically lower side of the second power module 604. The first and second heat sinks 804 and 808 facilitate heat transfer away from the first and second power modules 604 and 608, respectively.

In various implementations, an encapsulation material 812 may be included and encapsulate the first and second power modules 604 and 608 and the first and second heat sinks 804 and 808 and a portion of the conductor 704. Gate signals (G1 and G2) are relayed to the first and second switches 516 via conductors 816 and 820 that extend through the encapsulation material 812. In various implementations, the first and second heat sinks 804 and 808 may be made of a metal, such as aluminum or another suitable thermally conductive material. In various implementations, the first and second heat sinks 804 and 808 may be sintered or soldered metal fins.

While the example of FIG. 8 illustrates the conductor 704 extending vertically downwardly, the conductor 704 may extend horizontally (e.g., as shown in FIG. 7) through an aperture through the capacitor(s) 312.

Figure 9:
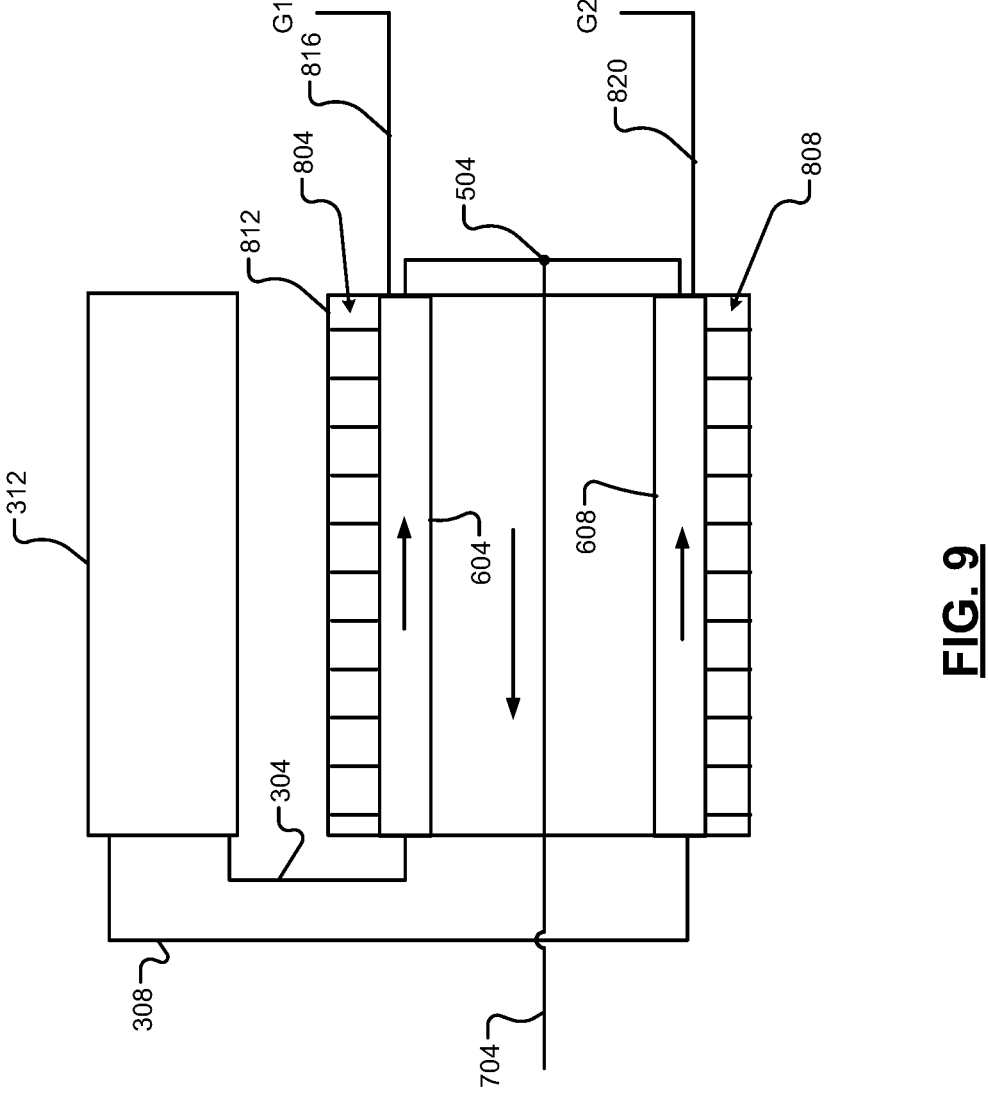

FIG. 9 is a cross-sectional view of an example implementation of the first leg 512 of the inverter module. As illustrated in FIG. 9, the capacitor(s) 312 may be disposed vertically above the first and second power modules 604 and 608. While the capacitor(s) 312 is shown as being disposed vertically above the first and second power modules 604 and 608, the capacitor(s) 312 may alternatively be disposed vertically below the first and second power modules 604 and 608. The conductor 704 may extend horizontally (e.g., as shown in FIG. 9) or extend vertically (e.g., as shown in FIG. 8).

Figure 10:
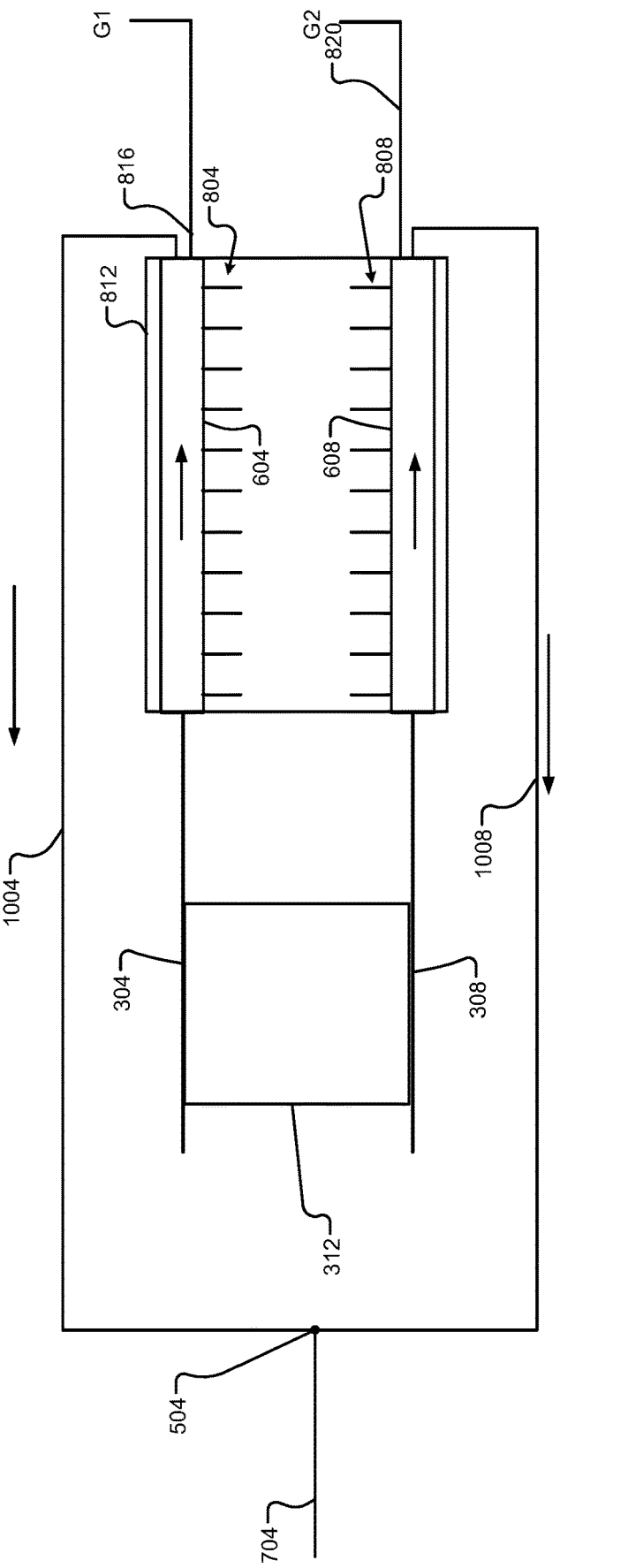

FIG. 10 is a cross-sectional view of an example implementation of the first leg 512 of the inverter module. In the example of FIG. 10, the first heat sink 804 may be disposed on and contact a vertically lower side of the first power module 604, and the second heat sink 808 may be disposed on and contact a vertically upper side of the second power module 608.

A first electrical conductor 1004 may be disposed vertically above the first power module 604 and connect to the first power module 604 and the node 504. A second electrical conductor 1008 may be disposed vertically below the second power module 608 and connect to the second power module 608 and the node 504. The node 504 may be disposed vertically between the first and second power modules 604 and 608. The first and second electrical conductors 1004 and 1008 may be considered to be portions of the conductor 704.

Figure 11:
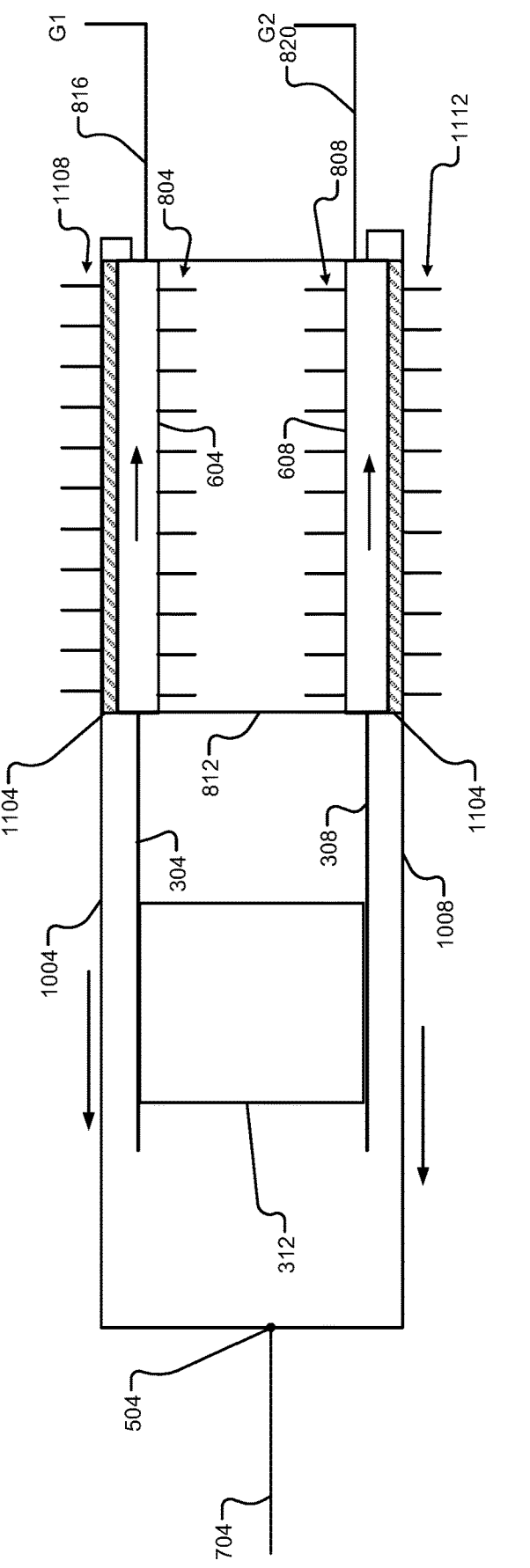

FIG. 11 is a cross-sectional view of an example implementation of the first leg 512 of the inverter module. In the example of FIG. 11, a thermal interface material (TIM) 1104 may be disposed on a vertically upper surface of the first power module 604 and on a vertically lower surface of the second power module 608. The TIM 1104 may be, for example, a heat transfer paste or another suitable type of thermally conductive material. The first and second conductors 1004 and 1008 may directly contact the TIM 1104. The TIM 1104 may be an electrically insulative/isolative material.

A third heat sink 1108 may be disposed vertically above the first conductor 1004, and a fourth heat sink 1112 may be disposed vertically below the second conductor 1008. The first and second heat sinks 804 and 808 may be disposed to facilitate heat transfer away from the first and second power modules 604 and 608, respectively, via the first and second conductors 1004 and 1008 and the TIM 1104.

Figure 12:
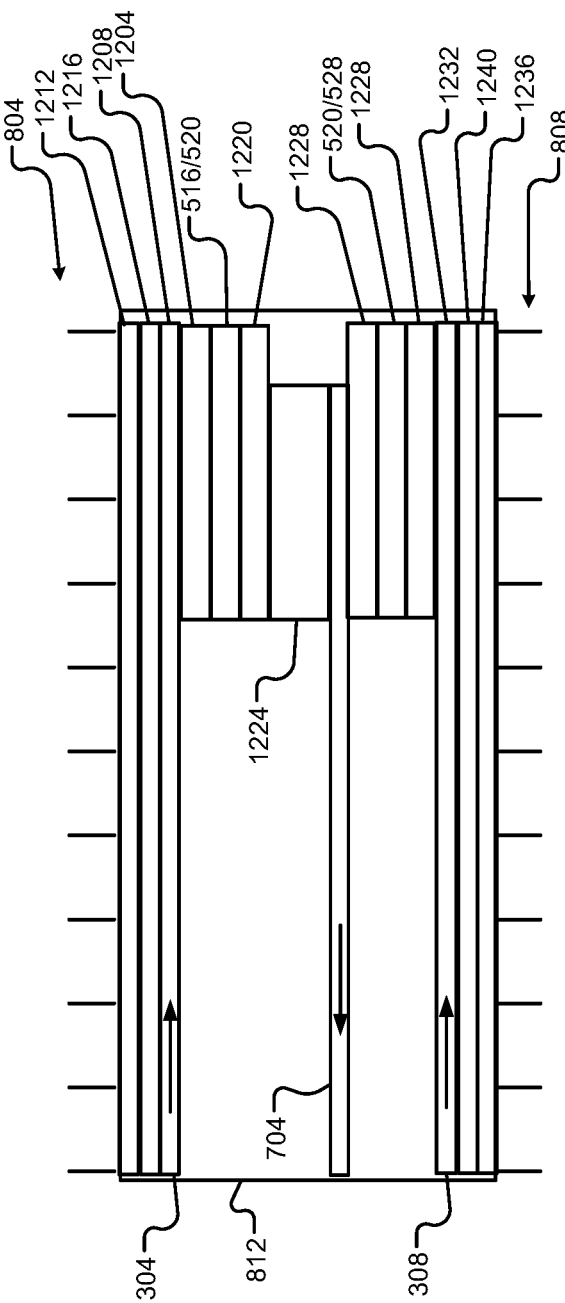

FIG. 12 is a cross-sectional view of an example implementation of a power module, such as of the first leg 512 of the inverter module. A metal soldered layer 1204 may be disposed vertically above a first die 516/524 and between the first die 516/524 and the high side 304. The first die 516/524 includes the first switch 516 and the first diode 524. In this example, the high side 304 may include an active metal brazed (AMB) or direct bonded copper (DBC) conductor including first and second copper layers 1208 and 1212 directly bonded to a ceramic layer 1216 that is sandwiched between the first and second copper layers 1208 and 1212. The first heat sink 804 may directly contact the second copper layer 1212.

A metal sintered or soldered layer 1220 may be disposed vertically between the first die 604 and a spacer 1224. The spacer 1224 may be made of an electrically conductive material, such as a metal. The spacer 1224 is disposed vertically between the sintered layer 1220 and the first conductor 704 that is connected to the motor 198.

A metal sintered or soldered layer 1228 may be disposed vertically below a second die 520/528 and between the second die 520/528 and the low side 308. In this example, the low side 308 may include an AMB or DBC conductor including first and second copper layers 1232 and 1236 directly bonded to a ceramic layer 1240 that is sandwiched between the first and second copper layers 1232 and 1236. The second heat sink 808 may directly contact the second copper layer 1236.

Figure 13:
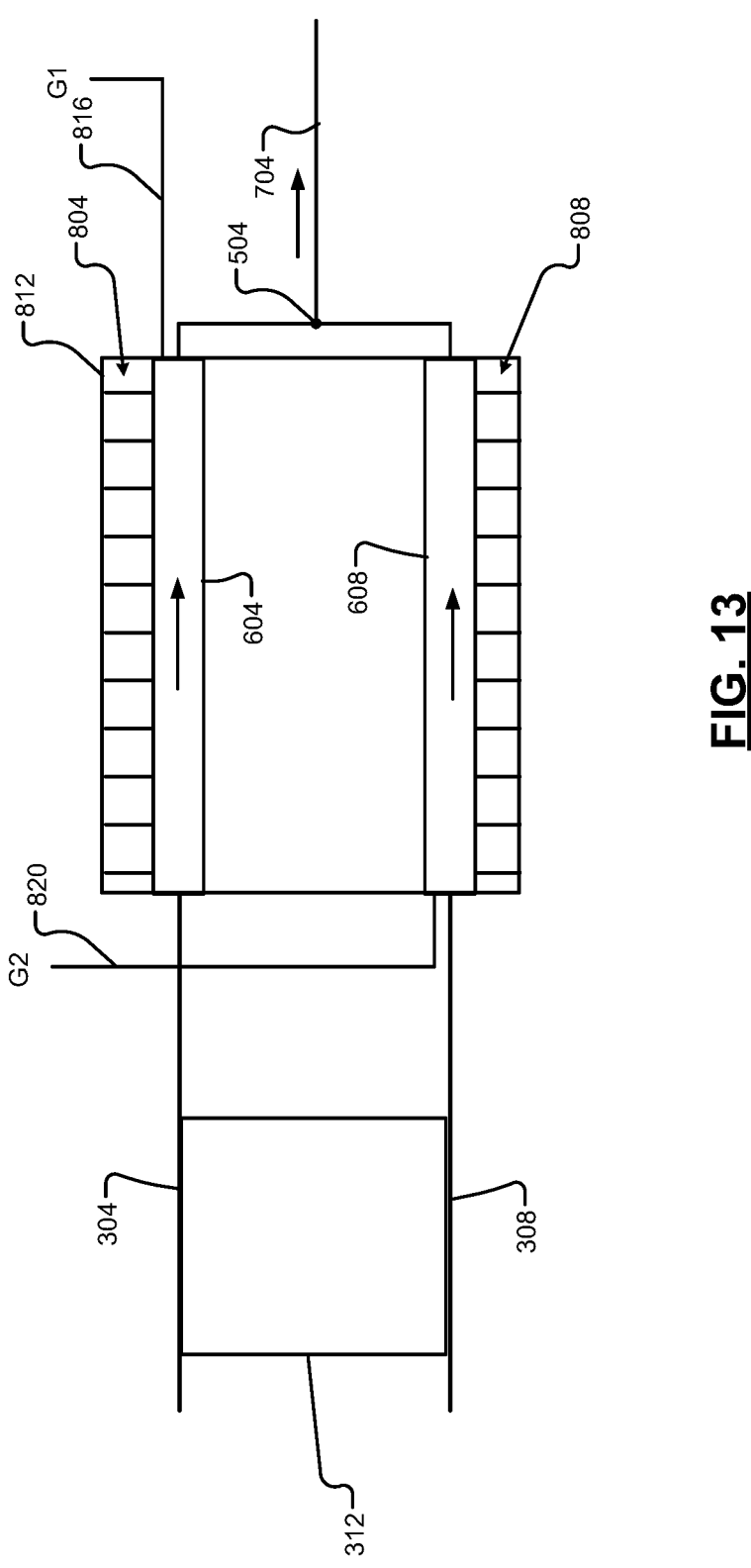
Figure 14:
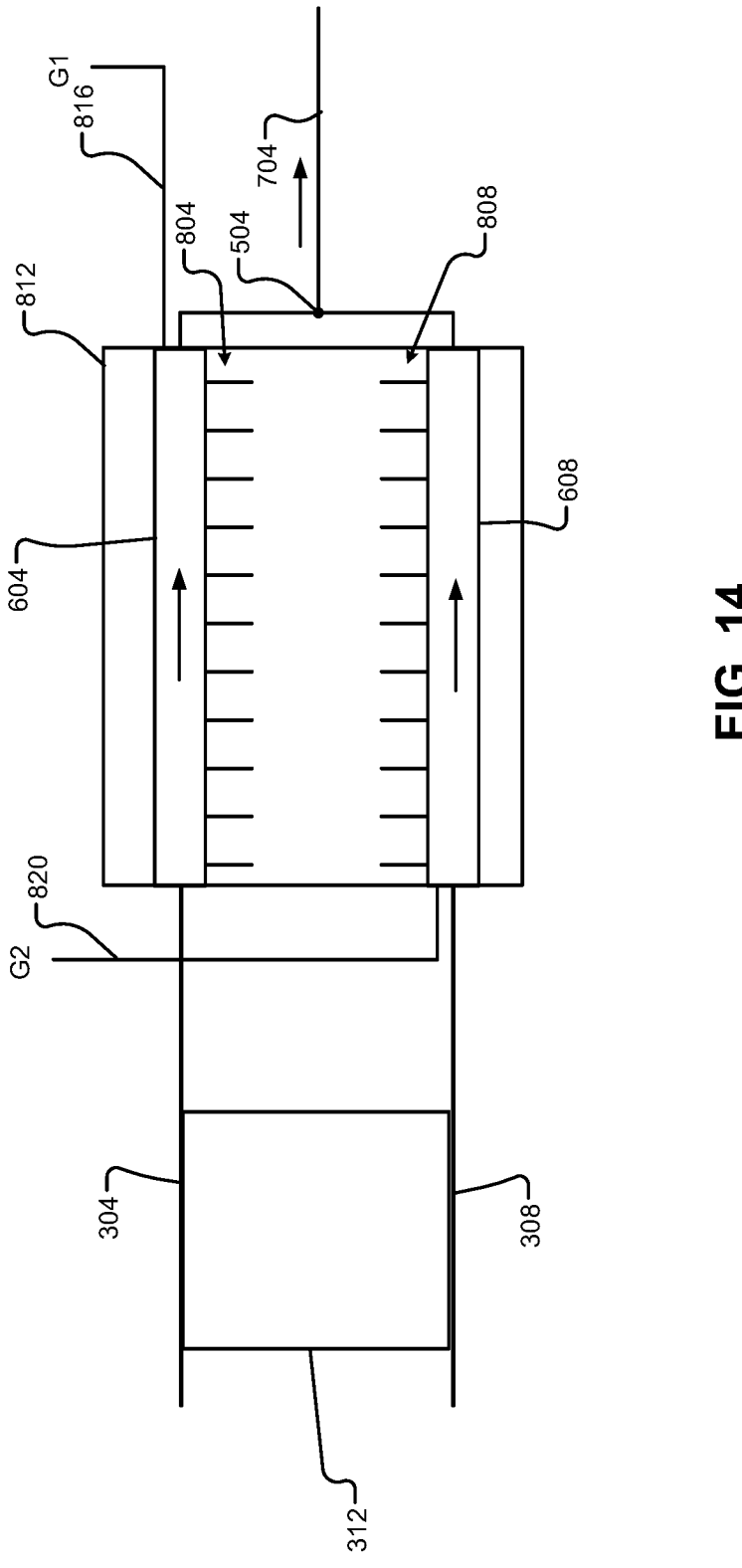

FIGS. 13 and 14 are cross-sectional views of an example implementation of the first leg 512 of the inverter module. In the example of FIGS. 13 and 14, the first conductor 704 extends in a direction away from the capacitor 312 and does not extend vertically between the first and second power modules 604 and 608. The first and second heat sinks 804 and 808 are disposed on the vertically upper and lower sides of the first and second power modules 604 and 608, respectively, in the example of FIG. 13. The first and second heat sinks 804 and 808 are disposed on the vertically lower and upper sides of the first and second power modules 604 and 608, respectively, in the example of FIG. 14.

Figure 15:
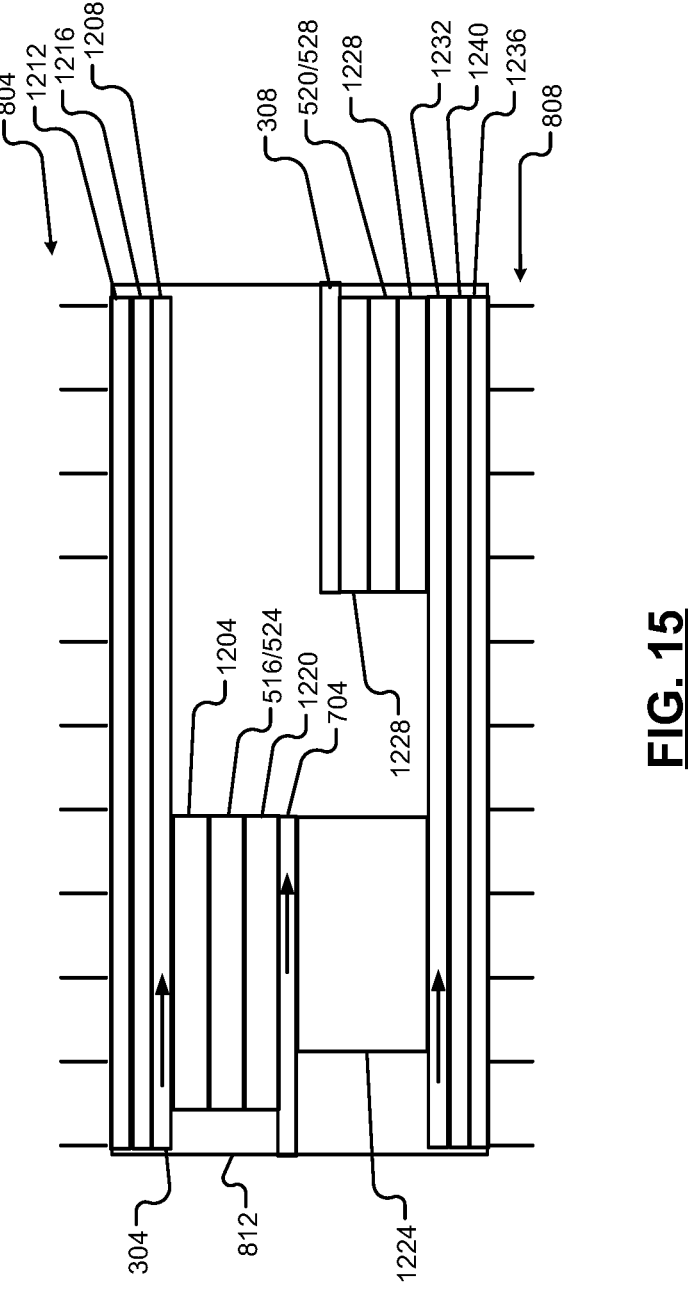

FIG. 15 is a cross-sectional view of an example implementation of a power module, such as of the first leg 512 of the inverter module. In the example of FIG. 15, the spacer 1224 is disposed directly between the conductor 704 and the copper layer 1232.

Figure 16:
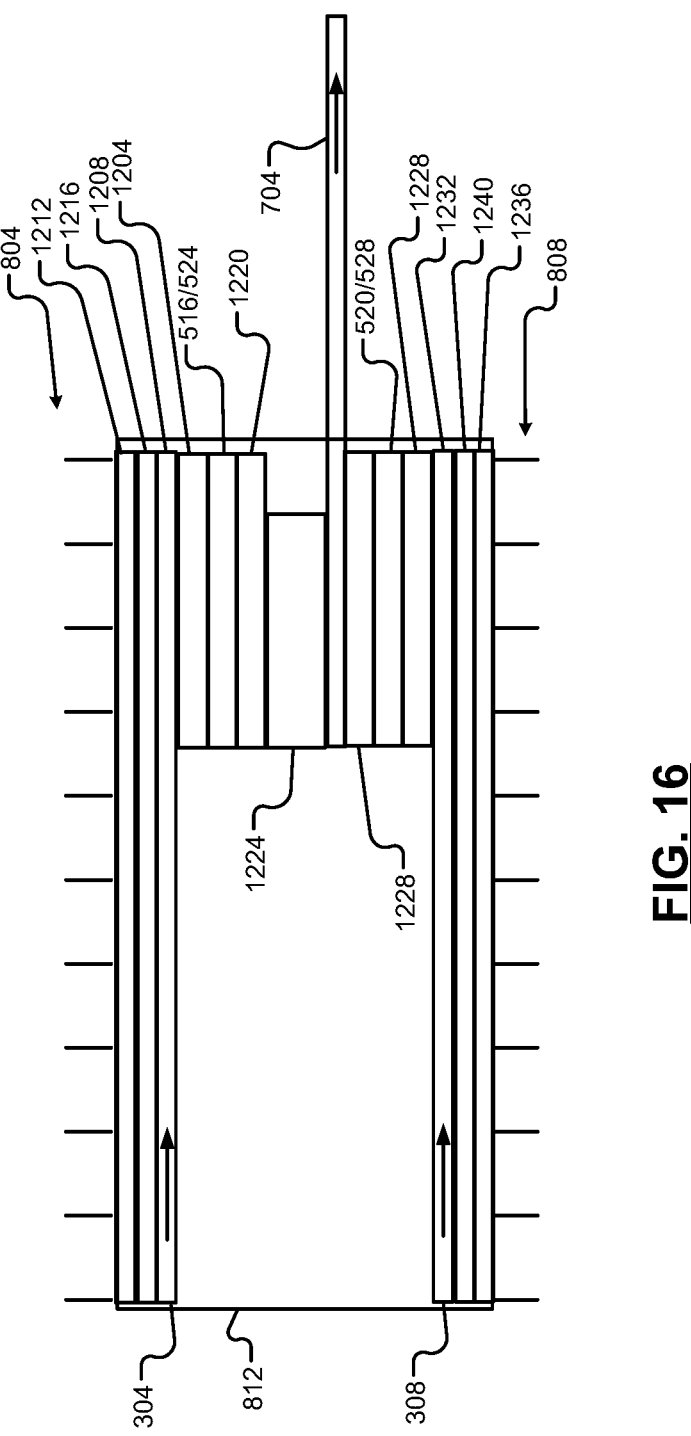

FIG. 16 is a cross-sectional view of an example implementation of the first leg 512 of the inverter module similar to FIGS. 13 and 14. In the example of FIG. 15, the conductor 704 extends rightward and not further between the high and low sides (conductors) 304 and 308.

Figure 17:
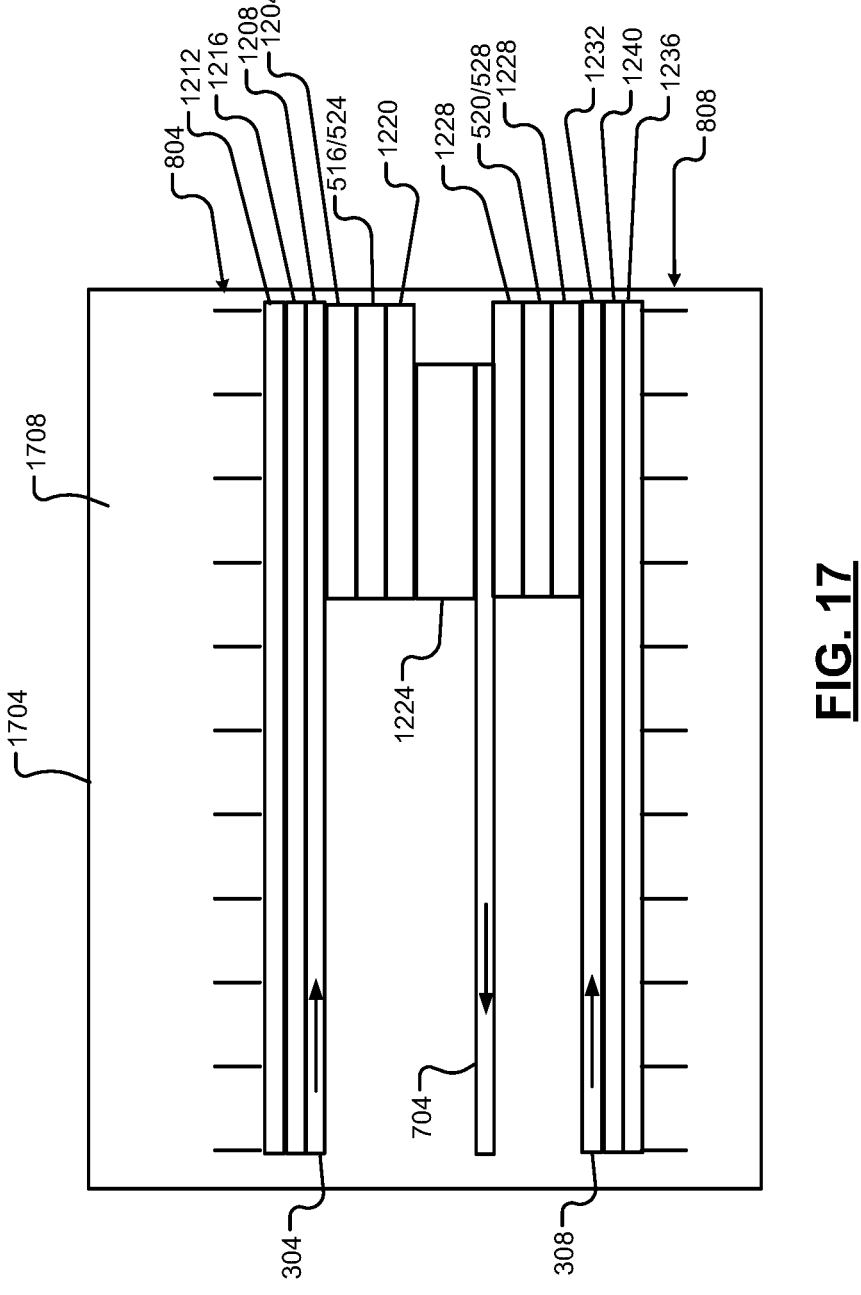

FIG. 17 is a cross-sectional view of an example implementation of the first leg 512 of the inverter module. As illustrated, the first and second power modules 604 and 608 may be disposed within a housing 1704. A coolant 1708 may be circulated through the interior of the housing 1704 (a coolant channel), such as through fins of the heat sinks to increase heat transfer away from the first and second dies 516/524 and 520/528. The coolant 1708 may be, for example, a liquid, a gas, or a phase change material. FIGS. 12 and 15-17 include an example (single) power module that includes both the first and second power modules 604 and 608.

Figure 18:
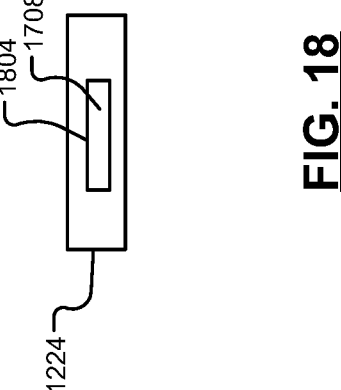
FIG. 18 is a cross-sectional view of an example implementation of a spacer.

FIG. 18 is a cross-sectional view of an example implementation of the spacer 1224. As illustrated in FIG. 18, the spacer 1224 may include a hollow core (coolant channel) 1804. Additionally or alternatively to FIG. 17, the coolant 1708 may be circulated through the core 1804, such as to increase heat transfer away from the first and second power modules 604 and 608. The example of FIG. 17 illustrates a form of immersive cooling, while the example of FIG. 18 illustrates a form of internal cooling.

Figure 19:
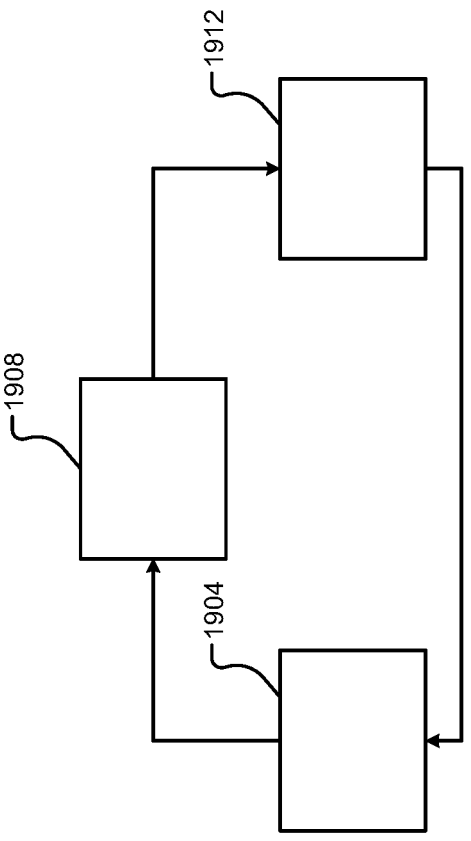
FIG. 19 is a functional block diagram of an example cooling system.
Figure 19:

FIG. 19 is a functional block diagram of an example cooling system. A coolant pump 1904 pumps cooler coolant through the coolant channel(s) 1908, such as 1704 and/or 1804. The coolant draws heat from the first and second dies 604 and 608. The then warmer coolant flows to a heat exchanger 1912 that increases heat transfer away from the coolant to a medium (e.g., air) passing the heat exchanger 1912. The coolant pump 1904 pumps the cooled coolant from the heat exchanger back to the coolant channel(s) 1908 for further cooling.

The parallel and vertically spaced orientation of the first and second power modules 604 and 608 such that top and bottom surfaces of the first power module 604 are parallel to top and bottom surfaces of the second power module 608 provide for more magnetic field cancellation and lower stray inductance. The AC output conductor being disposed between the power modules 604 and 608 and between the DC bus bars 304 and 308 also increases electromagnetic field cancellation. This minimizes stray inductance and loop inductance. The concepts above involve a thermal material stack up that enables single or double sided cooling to reduce thermal impedance. Lower stray inductance enables lower switching loss, decreases ringing, decreases electromagnetic interference (EMI), and decreases voltage and current peaks and device stress. This also minimizes parasitic inductance of the inverter module. The above also minimizes total loop size of the die/power modules and the capacitor(s) to minimize parasitic inductance. The output busbar (704) may be disposed between the dies and their connected busbars for increased magnetic field cancellation. Even if the die's current flow direction is vertical to AC busbar, the DC busbars and the high side and low side busbars still cancel electromagnetic fields with the AC busbar.

While the example of the inverter module is provided, the present application is also applicable to other types of power converters including half bridges, such as in power modules and as discussed above.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A leg of a power converter, the leg comprising:
   a first one of (a) a first power module and (b) a first die, the first one including a high side switch having a first terminal configured to be connected to a first direct current (DC) busbar having a first potential;
   a second one of (a) a second power module and (b) a second die, the second one including a low side switch having a first terminal configured to be connected to a second DC busbar having a second potential that is different than the first potential;
   an alternating current (AC) busbar disposed vertically (a) between the first one and the second one and (b) between the first DC busbar and the second DC busbar; and
   a capacitor disposed vertically between the first and second DC busbars;
   wherein the capacitor is disposed one of:
      vertically above the first one; and
      vertically below the second one.

2. The leg of claim 1 wherein the AC busbar is:
   disposed between a first vertically lower surface of the first one and a second vertically upper side of the second one; and
   electrically connected to second terminals of the high side and low side switches.

3. The leg of claim 2 wherein the AC busbar is configured to be electrically connected to a phase of an electric motor.

4. The leg of claim 2 further comprising electrically insulative material disposed between:
   the first vertically lower surface of the first one and the AC busbar; and
   the second vertically upper surface of the second one and the AC busbar.

5. The leg of claim 1 further comprising:
   a first heat sink that is configured to draw heat away from the first one; and
   a second heat sink configured to draw heat away from the second one.

6. The leg of claim 5 wherein:
   the first heat sink is disposed on a first vertically upper surface of the first one; and
   the second heat sink is disposed on a second vertically lower surface of the second one.

7. The leg of claim 5 wherein:
   the first heat sink is disposed on a first vertically lower surface of the first one; and
   the second heat sink is disposed on a second vertically upper surface of the second one.

8. The leg of claim 5 further comprising:
   a first heat sink disposed on a first vertically upper surface of the first one;
   a second heat sink disposed on a first vertically lower surface of the first one;

a third heat sink disposed on a second vertically upper surface of the second one; and a fourth heat sink disposed on a second vertically lower surface of the second one.

9. The leg of claim 5 wherein the AC busbar includes:

a first electrically conductive portion that is disposed vertically above a first vertically upper surface of the first one;

a second electrically conductive portion that is disposed vertically below a second vertically lower surface of the second one; and a third electrically conductive portion that is electrically connected to the first and second electrically conductive portions.

10. The leg of claim 9 wherein the AC busbar is configured to be electrically connected to a phase of an electric motor.

11. The leg of claim 9 further comprising electrically insulative material disposed between:

the first vertically upper surface of the first one and the first electrically conductive portion; and the second vertically lower surface of the second one and the second electrically conductive portion.

12. The leg of claim 1 wherein the capacitor is disposed at least partially horizontally beside the first and second ones.

13. The leg of claim 1 wherein the AC busbar extends horizontally through an aperture through the capacitor.

14. A system comprising:

a housing;

the leg of claim 1, wherein the leg is disposed within the housing; and coolant within the housing.

15. The leg of claim 1 wherein the first and second DC busbars each include first and second copper layers directly bonded to a ceramic layer.

16. The leg of claim 15 further comprising:

a first metal layer configured to electrically connect the first terminal of the high side switch to the first DC busbar;

a second metal layer configured to electrically connect a second terminal of the high side switch to an output busbar;

a third metal layer configured to electrically connect the first terminal of the low side switch to the second DC busbar; and a fourth metal layer configured to electrically connect a second terminal of the low side switch to the AC busbar.

17. The leg of claim 16 further comprising a spacer disposed vertically one of:

between the first DC busbar and the AC busbar; and between the second DC busbar and the AC busbar.

18. The leg of claim 17 wherein the spacer includes an internal coolant channel configured to receive a coolant.

19. A leg of a power converter, the leg comprising:

a first one of (a) a first power module and (b) a first die, the first one including a high side switch having a first terminal configured to be connected to a first direct current (DC) busbar having a first potential;

a second one of (a) a second power module and (b) a second die, the second one including a low side switch having a first terminal configured to be connected to a second DC busbar having a second potential that is different than the first potential;

an alternating current (AC) busbar disposed vertically (a) between the first one and the second one and (b) between the first DC busbar and the second DC busbar;

a first heat sink that is configured to draw heat away from the first one; and a second heat sink configured to draw heat away from the second one, wherein the AC busbar includes:

a first electrically conductive portion that is disposed vertically above a first vertically upper surface of the first one;

a second electrically conductive portion that is disposed vertically below a second vertically lower surface of the second one; and a third electrically conductive portion that is electrically connected to the first and second electrically conductive portions.

20. The leg of claim 19 wherein the first and second DC busbars each include first and second copper layers directly bonded to a ceramic layer.

* * * * *